United States Patent [19]

Knutrud

[11] 4,115,596
[45] Sep. 19, 1978

[54] METHOD FOR REDUCING THE TEMPERATURE OF BAKERY PRODUCTS

[75] Inventor: Leif Brudal Knutrud, Jar, Norway

[73] Assignee: Norsk Cerealinstitutt ved Statens Teknologiske Institutt, Oslo, Norway

[21] Appl. No.: 748,452

[22] Filed: Dec. 8, 1976

Related U.S. Application Data

[63] Continuation-in-part of Ser. No. 541,944, Jan. 17, 1975, abandoned.

[30] Foreign Application Priority Data

Jan. 18, 1974 [NO] Norway .................................. 740166

[51] Int. Cl.² ........................ A21D 13/00; A21D 15/02
[52] U.S. Cl. .......................................... 426/497; 34/15; 62/100; 426/524
[58] Field of Search ............... 426/524, 496, 497, 444, 426/505, 523; 34/15; 62/100, 268; 99/472

[56] References Cited

U.S. PATENT DOCUMENTS

| | | | |
|---|---|---|---|
| 2,021,772 | 11/1935 | Fleisher | 34/15 |
| 2,114,595 | 4/1938 | Fennema | 34/15 |

FOREIGN PATENT DOCUMENTS

| | | |
|---|---|---|
| 132,670 | 12/1975 | Norway. |
| 1,413,482 | 11/1975 | United Kingdom. |
| 1,413,481 | 11/1975 | United Kingdom. |

Primary Examiner—Kenneth M. Schor
Attorney, Agent, or Firm—Wenderoth, Lind & Ponack

[57] ABSTRACT

The temperature of bakery products is reduced immediately after the discharge thereof from the oven, by means of vacuum, by first subjecting the bakery products to a substantially linear pressure reduction as a function of time at a rate of not more than 60 mm Hg per second through at least half of the total pressure drop to be achieved. The pressure reduction rate is then allowed to increase substantially for a terminating vacuum treatment. At least one vacuum chamber is provided and is adapted to be connected to a source of vacuum through a vacuum conduit and a valve, and has a closeable opening for bringing bakery products into and out of the chamber. In the vacuum conduit, in parallel to a servo-valve serving to apply a full vacuum effect from the source of vacuum during the remaining portion of the total pressure drop, there is inserted a by-pass conduit having a permanently open cross-section which can be adjusted to provide the substantially linear pressure reduction.

4 Claims, 2 Drawing Figures

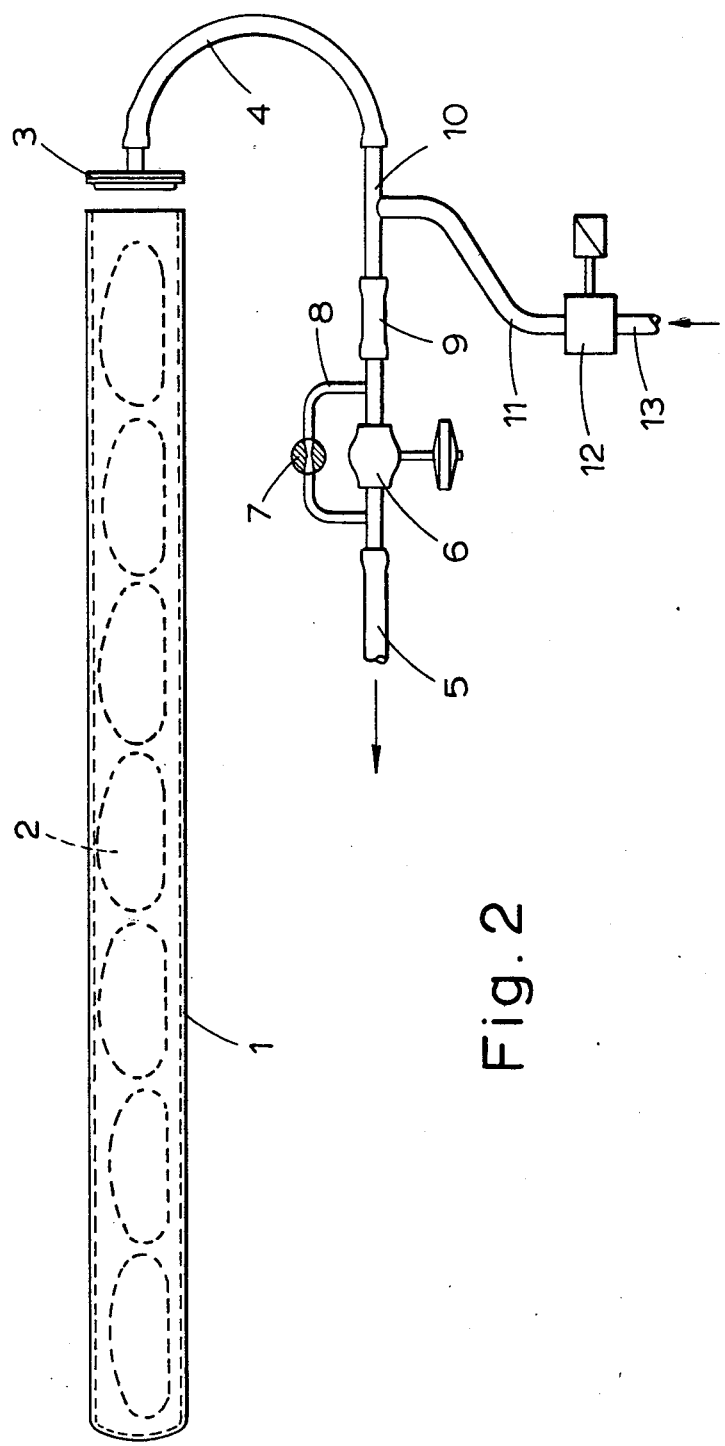

METHOD FOR REDUCING THE TEMPERATURE OF BAKERY PRODUCTS

This is a continuation-in-part of application Ser. No. 541,944, filed Jan. 17, 1975, now abandoned.

BACKGROUND OF THE INVENTION

This invention generally relates to a method and apparatus for reducing the temperature of bakery products immediately after the discharge thereof from the baking oven.

A particularly interesting form of bakery products in this connection is bread. The last stage of the baking process of a loaf of bread takes place in an oven having a temperature of from 200° to 270° C. with a baking time which varies from 45 minutes to 20 minutes, depending upon the temperature and the cross-section of the loaf of bread. The crumb of the loaf has a temperature of about 95° C. at the termination of the baking time, whereas the temperature of the crust is about 150° C., the former temperature having been rather constant during the last part of the baking time because of evaporation of the moisture content in the loaf of bread.

For a number of different reasons it has been common practice to wrap bakery products, in particular bread, in bags for distribution and sale.

If the loaves are packed directly from the oven, the bag cannot be closed since the vapour from the interior of the loaf cannot find any path of escape and condenses on the inner side of the bag. This makes the bag soft. If a bag of plastic material is used, the surface of the loaf of bread will be softened by the water resulting from the condensed vapour. In the case of bread for which a crisp crust is a quality criterion (wheat bread), care should be taken during packing of the warm loaves that the open bag with its content is put in an upright position so that easy vapour escape is secured. The use of plastic materials for packing bread types having a long shelf life or good keeping qualities (whole meal bread) is not possible unless the loaves are first cooled. Bakers who have found it advantageous to sell whole meal bread in closed bags of plastic material therefore must provide for the cooling of the loaves of bread at least for one hour before packing, either by loading them on shelf carriages which are rolled into large cooling halls, or by means of a conveyor system which takes the loaves on a round trip lasting an hour or so. Such arrangements are very labour-consuming and/or require large investments.

Cooling of the loaves of bread in the above arrangement takes place as a combination of (a) radiation, (b) convection and (c) evaporation. If a high relative humidity is maintained in the cooling space, the evaporation rate will be lower, which means that the loss of bread weight is reduced, which of course, is of importance. The reduced loss, however, must be seen in relation to the expenses in the form of labour, time and capital which are necessary in order to obtain this result.

It is known that cooling of bakery products can be effected by means of vacuum treatment, which is described in "The Bakers Digest", Oct. 1949 and in "The Arkady Review", Volume 49, No. 2, 1973. The previously described methods for the vacuum cooling of bread, however, have not been completely successful and in particular have not made it possible to obtain a maximum of processing capacity with reasonable installation and operation expenses for the necessary equipment. An important requirement of the method is also that the vacuum treatment must not result in damage to the structure of the bakery product, in particular the surface or crust thereof. This represents a serious problem which for the first time has been solved with the present invention insofar as large capacity cooling is concerned.

SUMMARY OF THE INVENTION

As in many mass production processes, the key to an economic and effective production is dependent upon the time period of treatment in each process step being reduced to a minimum. For the vacuum treatment of bakery products a vacuum chamber is necessarily required, and it is an essential prerequisite to this invention that the vacuum chambers employed have a comparatively small volume. This makes it possible with a moderate pumping capacity in the vacuum system to apply short treatment times in these chambers, whereby the operating rate and thus the production capacity will be high.

According to the invention it has been found that a short vacuum treatment time makes it necessary to keep close supervision and control of the pressure variation in the chamber. Thus, according to the invention it is essential that the bakery products are first subjected to a substantially linear pressure reduction at a velocity of not more than 60 mm Hg per second, at least through half of the total pressure drop employed, and that the pressure reducing velocity is then allowed to increase substantially for a finishing vacuum treatment.

The bakery products are subjected to the first linear pressure reduction immediately after discharge from the oven and without subjecting the bakery products to an initial air cooling operation.

A desired loaf temperature can be obtained by putting the loaf in a chamber in which the pressure is reduced to a value corresponding to the vapour pressure at the desired temperature. Water having a higher temperature than the desired temperature will boil at this pressure. The heat bound by the boiling is taken from the loaf. In practice the cooling follows the rate of pressure reduction. As mentioned above, however, it is shown in connection with this invention that there is a practical limit to the pressure reducing velocity. If the velocity is too high, damage will be caused to the loaf because of the relatively large amounts of vapour released.

BRIEF DESCRIPTION OF THE DRAWINGS

In the following description the invention shall be explained more closely with reference to the attached drawings in which:

FIG. 2 is a schematic view of a vacuum chamber with associated equipment for cooling bakery products, in particular bread.

DETAILED DESCRIPTION OF THE INVENTION

Figure 1:
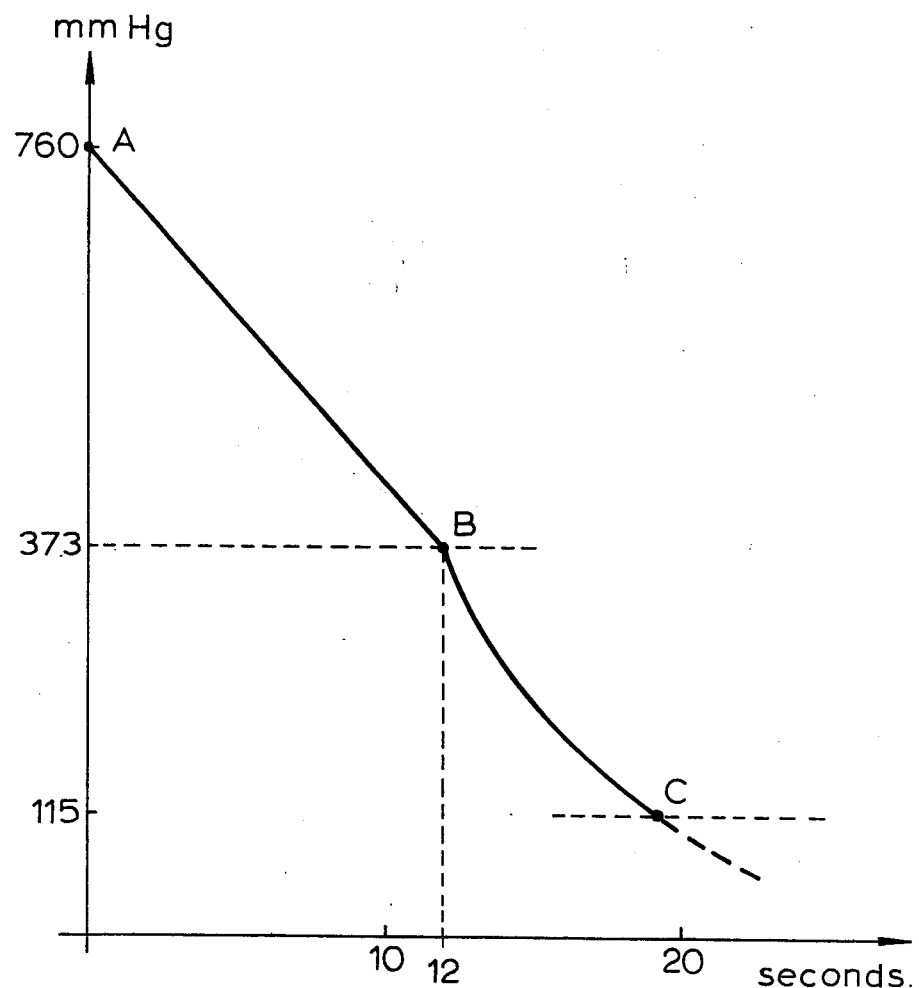
FIG. 1 is a diagram illustrating the pressure variation during one example of a vacuum treatment operation according to the invention.

The pressure reducing process shown in FIG. 1 takes place in two stages from a point A corresponding to atmospheric pressure. The first stage runs substantially linearly from the starting point at A to a point B during about 12 seconds, and during which about 60% of the total pressure drop employed is traversed, i.e. from about 760 to about 373 mm Hg. This linear pressure drop can adequately be provided for by means of pressure equalization through a conduit having a cross-sectional restriction, for instance a nozzle of about 5 mm diameter. This device will be described in more detail below. Whereas during the first pressure reduction stage between the points A and B it is of great importance that the rate of pressure reduction does not exceed a certain value, depending among other things to a certain degree upon the type of bakery products being treated, the remaining portion of the pressure drop can be effected without such limitation. This appears from the curve of FIG. 1, which from the point B falls off with substantially greater inclination than during the first portion of the pressure reduction. As usual in such pressure equalization processes the curve will eventually flatten out, and the treatment according to the invention is terminated at a point C after a total treatment time of about 20 seconds, somewhat more than 80% of the original pressure having then been removed. The terminating pressure will correspond to the vapour pressure at the desired temperature after the vacuum treatment. The values shown in the diagram of FIG. 1 relate to a temperature reduction to about 54° C. corresponding to a vapour pressure of about 0.15 kp/cm$^2$ or 85% vacuum. This corresponds to 115 mm Hg in a normal atmosphere. When treating seven loaves of bread simultaneously (as indicated by way of example in FIG. 2), the following figures can serve to illustrate the method of the invention. After baking, the weight of seven loaves is about 6.25 kg, of which about 37% is water. At full balance between the vapour pressure of the water content and the ambient atmosphere the evaporated water will correspond to the cooling of the loaves from 95° C. to 54° C.

Half or preferably 60% of the pressure drop is linear in order that the vapour developed in the loaf of bread will be able to escape through the natural pores of the crust at a pressure difference which does not break the crust. The pressure reducing velocity is lower than 60 mm Hg per second, which in the pressure reducing process example of FIG. 1 corresponds to performing the linear portion of the pressure reduction, i.e. from 760 to 373 mm Hg, during not less than approximately 6.5 seconds. It should be noted that line A—B in the example of FIG. 1 illustrates a linear pressure drop of approximately 32 mm Hg/second, i.e. at a rate less than the maximum rate. The terminating pressure and the linear portion of the process are variable.

In the example shown in FIG. 1 the total pressure is reduced from normal atmospheric pressure, i.e. 760 mm Hg, to 115 mm Hg. This corresponds to an approximately 85% vacuum reduction. In this specific example the temperature is reduced to approximately 54° C. It is to be understood that the scope of the present invention includes reductions to pressures corresponding to other temperatures. For example, it may be desirable in the bakery product cooling operation to reduce the temperature down 35° C., which temperature would correspond to a pressure reduction to approximately 42 mm Hg. Further, it may be sufficient in other circumstances to reduce the temperature of the bakery products to approximately 60° C., such temperature corresponding to a pressure reduction to approximately 150 mm Hg.

Accordingly, it will be understood that the overall temperature reduction is chosen for a particular bakery product or environment, and then the parameters of the two pressure reduction operations are designed.

It is important in accordance with the present invention that the pressure drop during the first pressure reduction operation correspond to at least half of the total pressure reduction of the first and second pressure reduction operations.

It is further important in accordance with the present invention that the maximum rate of pressure reduction in the first linear pressure reduction operation be lower than 60 mm Hg per second. The minimum velocity of pressure rate reduction is not particularly critical. It is of course desired that the pressure reduction, and therefore the cooling, be achieved as rapidly as possible. The actual linear pressure reduction rate of the first pressure reduction operation employed will depend upon certain practical considerations, such as for example cooling equipment capacity. It has however been found that a minimum pressure reduction rate for the first or linear pressure reduction operation of 10 mm Hg per second is satisfactory. This minimum rate is of course substantially slower than the maximum allowed rate, but is intended to be within the scope of the present invention, as long as the other parameters and requirements of the present invention are followed. A further possible minimum rate of pressure reduction to be employed during the first or linear pressure reduction operation may be 30 mm Hg per second.

However, as discussed above, the critical feature of the present invention is that the maximum rate of pressure reduction during the first or linear pressure reduction operation not exceed 60 mm Hg per second.

A schematic and simplified example of an apparatus according to the invention is shown in FIG. 2. This apparatus is based on cooperation with an oven from which the loaves of bread are pushed out in groups or rows of 7–8 loaves in a direction parallel or transverse to the longitudinal direction of the oven at an angle of 90° by means of a conveyor or an ejector associated with the oven. The loaves 2 are conveyed in their longitudinal direction into a cylindrical vacuum chamber 1 which can be closed with a cover 3 to which there is connected a vacuum conduit 4 with associated valves and connections. More specifically, this vacuum system consists of a branch piece 10, a short vacuum conduit 9 and a servo-valve 6 which through an additional vacuum conduit 5 serves to connect the vacuum chamber 1 to a vacuum pump or another source of vacuum which is not shown in the drawings. Parallel to the servo-valve 6 there is provided a by-pass conduit 8 which has a calibrated or adjustable cross-section which is restricted in relation to the open flow cross-section of servo-valve 6, so as to give the slower, near to linear pressure reduction at the beginning of the vacuum treatment. For adjustment or control of the linear pressure reduction rate there is inserted a control valve 7 in the by-pass conduit 8.

For terminating the vacuum treatment a magnet valve 12 is connected to the branch piece 10 through a conduit 11 for allowing atmospheric pressure to enter the chamber 1. For this purpose the magnet valve 12 is connected to the ambient atmosphere through a conduit 13.

Especially during starting up of the process the vapour from the bakery products may condense in the cylindrical chamber. In practice it may therefore be an advantage to provide means for preventing condensed water from reaching the crust on the products being treated. For hygienic reasons, however, it may be desirable to avoid inlays, inserts or the like in the chamber for this purpose. Condensation is prevented by heating the chamber. This can be done by suitable means, for instance by radiant heat.

In connection with the drawings there is no detailed illustration of mechanisms for opening and closing the cover 3 on the chamber 1 in FIG. 2, but the necessary structure for obtaining these functions will be readily understood by persons skilled in the art.

Various modifications may be made to the above described specific structural and operational features without departing from the scope of the invention.

What is claimed is:

1. A process for rapid vacuum cooling of hot bakery products, immediately after the discharge thereof from an oven, to a temperature suitable for packaging said bakery products, and for forming said bakery products with a relatively thick and crisp crust without bursting said crust, said process consisting essentially of:

subjecting bakery products, immediately after the completion of baking and discharge thereof from an oven at atmospheric pressure, and without subjecting said bakery products to a deliberate initial air cooling operation, to a first pressure reduction which is substantially linear as a function of time at a rate of from 10 to 60 mm Hg per second, thereby preventing bursting of the crust of said bakery products; and immediately thereafter subjecting said bakery products to a second non-linear pressure reduction at an increased rate, and reducing the pressure to a value corresponding to the vapor pressure of a desired temperature suitable for packaging said bakery products;

the reduction of pressure during said first pressure reduction comprising at least half the total reduction of pressure of said first and second pressure reductions; and wherein substantially all of the cooling of the bakery products is done by using a vacuum to subject the bakery products to reduced pressures.

2. A process as claimed in claim 1, wherein said reduction of pressure during said first pressure reduction comprises approximately 60% of said total pressure reduction.

3. A process as claimed in claim 2, wherein said first pressure reduction is completed in approximately 12 seconds, and said total pressure reduction is completed in approximately 20 seconds.

4. A process as claimed in claim 1, wherein both said first and second pressure reductions are achieved by use of a single vacuum source.

* * * * *